(12) United States Patent
Beck et al.

(10) Patent No.: US 9,759,299 B2
(45) Date of Patent: Sep. 12, 2017

(54) AUXILIARY TRANSMISSION FOR A VEHICLE

(71) Applicant: ZF Friedrichshafen AG, Friedrichshafen (DE)

(72) Inventors: Stefan Beck, Eriskirch (DE); Michael Wechs, Lindau (DE); Viktor Warth, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 163 days.

(21) Appl. No.: 14/792,671

(22) Filed: Jul. 7, 2015

(65) Prior Publication Data

US 2016/0040768 A1     Feb. 11, 2016

(30) Foreign Application Priority Data

Aug. 6, 2014   (DE) .................. 10 2014 215 551

(51) Int. Cl.
*F16H 3/62*     (2006.01)
*F16H 3/44*     (2006.01)
(Continued)

(52) U.S. Cl.
CPC ............. *F16H 37/042* (2013.01); *F16H 3/64* (2013.01); *F16H 3/66* (2013.01); *F16H 2003/442* (2013.01); *F16H 2200/0034* (2013.01); *F16H 2200/0052* (2013.01); *F16H 2200/0078* (2013.01); *F16H 2200/2007* (2013.01); *F16H 2200/2012* (2013.01); *F16H 2200/2017* (2013.01); *F16H 2200/2038* (2013.01);
(Continued)

(58) Field of Classification Search
CPC ................. F16H 2200/2017; F16H 2200/2051
See application file for complete search history.

(56) References Cited

U.S. PATENT DOCUMENTS 6,926,635 B2   8/2005   Biermann
6,960,149 B2   11/2005  Ziemer
(Continued)

FOREIGN PATENT DOCUMENTS

DE   101 15 983 A1   10/2002
DE   101 15 985 A1   10/2002
(Continued)

OTHER PUBLICATIONS

German Search Report corresponding to DE10 2014 215 551.7 dated Feb. 17, 2016.

*Primary Examiner* — Tisha Lewis
(74) *Attorney, Agent, or Firm* — Davis & Bujold, PLLC; Michael J. Bujold

(57) ABSTRACT

A motor vehicle group transmission with at least one housing, a main transmission and a range transmission connected downstream from the main transmission. The main transmission comprises at least four planetary gearsets, each of which comprises a sun gear, a carrier, a planetary gearwheel mounted on the carrier and a ring gear, and at least five shifting elements. The range transmission includes at least two planetary gearsets, each of which has a sun gear, a carrier, a planetary gearwheel mounted on the carrier and a ring gear, and at least three shifting elements. The main transmission and the range transmission, together in combination, provide at least thirteen forward gears and at least eight reverse gears.

17 Claims, 15 Drawing Sheets

(51) Int. Cl.
 *F16H 37/06* (2006.01)
 *F16H 37/04* (2006.01)
 *F16H 3/64* (2006.01)
 *F16H 3/66* (2006.01)

(52) U.S. Cl.
 CPC ............... *F16H 2200/2043* (2013.01); *F16H 2200/2051* (2013.01); *F16H 2200/2064* (2013.01); *F16H 2200/2094* (2013.01); *F16H 2200/2097* (2013.01)

(56) References Cited

U.S. PATENT DOCUMENTS

| | | |
|---|---|---|
| 6,984,187 B2 | 1/2006 | Biermann |
| 6,991,578 B2 | 1/2006 | Ziemer |
| 8,858,387 B2 | 10/2014 | Haupt et al. |
| 2011/0263370 A1* | 10/2011 | Borntraeger ............ B60K 6/26 475/5 |
| 2014/0364271 A1* | 12/2014 | Kaltenbach ............ F16H 3/006 475/286 |
| 2016/0061304 A1* | 3/2016 | Kaltenbach ............ F16H 3/66 475/5 |

FOREIGN PATENT DOCUMENTS

| | | | |
|---|---|---|---|
| DE | 101 15 986 A1 | 10/2002 | |
| DE | 101 15 995 A1 | 10/2002 | |
| DE | 10 2009 001 253 B3 | 6/2010 | |
| DE | 10 2009 029 156 A1 | 3/2011 | |
| DE | 10 2011 087 947 A1 | 6/2013 | |
| GB | 1307352 * | 2/1973 | ............... F16H 3/66 |

* cited by examiner

| GEAR | | SHIFTING ELEMENTS CLOSED | | | | | | | | TRANS-MISSION RATIO i | GEAR INTERVAL φ |
|---|---|---|---|---|---|---|---|---|---|---|---|
| | | B1 | B2 | K1 | K2 | K3 | R | L | H | | |
| FORWARD | V1 | X | X | | X | | | X | | 29,41 | |
| | | | | | | | | | | | 1,35 |
| | V2 | X | X | X | | | | X | | 21,74 | |
| | | | | | | | | | | | 1,37 |
| | V3 | | X | X | X | | | X | | 15,92 | |
| | | | | | | | | | | | 1,35 |
| | V4 | | X | X | | X | | X | | 11,79 | |
| | | | | | | | | | | | 1,37 |
| | V5 | | X | | X | X | | X | | 8,63 | |
| | | | | | | | | | | | 1,36 |
| | V6 | | | X | X | X | | X | | 6,33 | |
| | V7 | X | | X | X | | | X | | 5,53 | 1,35 |
| | V8 | X | | X | | X | | X | | 4,68 | |
| | | | | | | | | | | | 1,36 |
| | V9 | X | X | X | | | | | X | 3,43 | |
| | | | | | | | | | | | 1,37 |
| | V10 | | X | X | X | | | | X | 2,51 | |
| | | | | | | | | | | | 1,35 |
| | V11 | | X | X | | X | | | X | 1,86 | |
| | | | | | | | | | | | 1,37 |
| | V12 | | X | | X | X | | | X | 1,36 | |
| | | | | | | | | | | | 1,36 |
| | V13 | | | X | X | X | | | X | 1,00 | |
| | | | | | | | | | | | 1,14 |
| | V14 | X | | X | X | | | | X | 0,87 | |
| | | | | | | | | | | | 1,18 |
| | V15 | X | | X | | X | | | X | 0,74 | |
| REVERSE | R1 | X | X | | X | | X | | | -32,57 | |
| | | | | | | | | | | | 1,36 |
| | R2 | X | X | X | | | X | | | -24,04 | |
| | | | | | | | | | | | 1,37 |
| | R3 | | X | X | X | | X | | | -17,58 | |
| | | | | | | | | | | | 1,35 |
| | R4 | | X | X | | X | X | | | -13,02 | |
| | | | | | | | | | | | 1,37 |
| | R5 | | X | | X | X | X | | | -9,53 | |
| | | | | | | | | | | | 1,36 |
| | R6 | | | X | X | X | X | | | -7,00 | |
| | | | | | | | | | | | 1,14 |
| | R7 | X | | | | | | | | -6,12 | |
| | | | | | | | | | | | 1,18 |
| | R8 | X | | X | | X | X | | | -5,17 | |

Fig. 2

| GEAR | | SHIFTING ELEMENTS CLOSED | | | | | | | | TRANS-MISSION RATIO i | GEAR INTERVAL φ |
|---|---|---|---|---|---|---|---|---|---|---|---|
| | | B1 | B2 | K1 | K2 | K3 | R | L | H | | |
| FORWARD | V1 | X | X | | X | | | X | | 16.00 | |
| | | | | | | | | | | | 1.36 |
| | V2 | X | X | X | | | | X | | 11.81 | |
| | | | | | | | | | | | 1.37 |
| | V3 | | X | X | X | | | X | | 8.64 | |
| | | | | | | | | | | | 1.35 |
| | V4 | | X | X | | X | | X | | 6.40 | |
| | | | | | | | | | | | 1.37 |
| | V5 | | X | | X | X | | X | | 4.68 | |
| | | | | | | | | | | | 1.36 |
| | V6 | | | X | X | X | | X | | 3.44 | |
| | | | | | | | | | | | 1.35 |
| | V7 | X | | X | X | | | X | | 3.00 | |
| | | | | | | | | | | | 1.18 |
| | V8 | X | | X | | X | | X | | 2.54 | |
| | | | | | | | | | | | 1.36 |
| | V9 | | X | X | | X | | | X | 1.86 | |
| | | | | | | | | | | | 1.37 |
| | V10 | | X | | X | X | | | X | 1.36 | |
| | | | | | | | | | | | 1.36 |
| | V11 | | | X | X | X | | | X | 1.00 | |
| | | | | | | | | | | | 1.14 |
| | V12 | X | | X | X | | | | X | 0.87 | |
| | | | | | | | | | | | 1.18 |
| | V13 | X | | X | | X | | | X | 0.74 | |
| REVERSE | R1 | X | X | | X | | X | | | -30.49 | |
| | | | | | | | | | | | 1.35 |
| | R2 | X | X | X | | | X | | | -22.52 | |
| | | | | | | | | | | | 1.37 |
| | R3 | | X | X | X | | X | | | -16.47 | |
| | | | | | | | | | | | 1.35 |
| | R4 | | X | X | | X | X | | | -12.21 | |
| | | | | | | | | | | | 1.37 |
| | R5 | | X | | X | X | X | | | -8.94 | |
| | | | | | | | | | | | 1.36 |
| | R6 | | | X | X | X | X | | | -6.56 | |
| | | | | | | | | | | | 1.15 |
| | R7 | X | | | X | X | | | | -5.73 | |
| | | | | | | | | | | | 1.18 |
| | R8 | X | | X | | X | X | | | -4.84 | |

AUXILIARY TRANSMISSION FOR A VEHICLE

This application claims priority from German patent application serial no. 10 2014 215 551.7 filed Aug. 6, 2014.

FIELD OF THE INVENTION

The invention concerns a group transmission for a motor vehicle.

BACKGROUND OF THE INVENTION

In utility vehicles, typically manual-shift transmissions or even automated manual-shift transmissions are used as group transmissions. Such manual-shift transmissions and automated manual-shift transmissions are highly efficient and relatively inexpensive. In such manual-shift transmissions and automated manual-shift transmissions gearshifts take place with traction force interruption.

The use of dual-clutch transmissions in passenger cars is increasing. In such dual-clutch transmissions, gearshifts can be carried out without traction force interruption. However, dual-clutch transmissions are relatively large and heavy, and incur higher purchase costs. Moreover, dual-clutch transmissions can only be used as group transmissions to a limited extent, since due to the fact that with group transmissions an almost geometrical gear gradation is desirable, when a dual-clutch transmission is used the gear intervals are too small in the lower gears and accordingly too large a number of shifts would be necessary in the lower gears. This is also because with a dual-clutch transmission, by virtue of the system individual gears cannot be skipped.

From DE 10 2011 087 947 A1 a group transmission comprising a main transmission and a range transmission downstream therefrom is known, wherein the main transmission comprises two planetary gearsets or planetary gear assemblies and four interlocking shifting elements and the range transmission also comprises two planetary gearsets or planetary gear assemblies and four interlocking shifting elements.

There is a need for a group transmission for a motor vehicle, which while having a compact structure, a large ratio spread and high efficiency, can provide a large number of gears with approximately geometrical gear gradation.

SUMMARY OF THE INVENTION

Starting from there, the purpose of the present invention is to provide a new type of group transmission for a motor vehicle.

That objective is achieved by a group transmission for a motor vehicle as described below.

The group transmission for a motor vehicle according to the invention comprises a housing, a main transmission and a range transmission connected downstream from the main transmission, wherein the main transmission comprises at least four planetary gearsets, each having a sun gear, a carrier, a planetary gearwheel mounted on the carrier and a ring gear, and at least five shifting elements; wherein the range transmission comprises at least two planetary gearsets, each of which comprises a sun gear, a carrier, a planetary gearwheel mounted on the carrier and a ring gear, and at least three shifting elements; wherein the main transmission and the range transmission in combination together provide at least thirteen forward gears and at least eight reverse gears.

With the help of the group transmission for a motor vehicle according to the invention, a large number of gears with an almost geometrical gear gradation can be provided, along with a compact structure, a large ratio spread and high efficiency.

In an advantageous further development a sun gear of a first planetary gearset associated with the main transmission can be coupled to the housing with interposition of a first shifting element associated with the main transmission; whereas a carrier of a second planetary gearset associated with the main transmission is permanently coupled to a drive-input-side shaft of the group transmission for a motor vehicle; whereas a ring gear of the second planetary gearset is permanently coupled to a sun gear of a third planetary gearset associated with the main transmission; whereas a carrier of a fourth planetary gearset associated with the main transmission is permanently coupled to a sun gear of a fifth planetary gearset associated with the range transmission; whereas a ring gear of the fifth planetary gearset is permanently coupled to a sun gear of a sixth planetary gearset associated with the range transmission and a carrier of the fifth planetary gearset is permanently coupled to a ring gear of the sixth planetary gearset; whereas a carrier of the sixth planetary gearset is permanently coupled to a drive-output-side shaft of the group transmission for a motor vehicle; whereas when the first planetary gearset is made as a minus planetary gearset, a second shifting element associated with the main transmission is connected either between a ring gear of the first planetary gearset and the housing or between the carrier of the first planetary gearset and the ring gear of the fourth planetary gearset or between the sun gear of the first planetary gearset and the first shifting element, or, if the first planetary gearset is made as a plus planetary gearset, the second shifting element is connected either between the carrier of the first planetary gearset and the housing or between the ring gear of the first planetary gearset and the ring gear of the fourth planetary gearset or between the sun gear of the first planetary gearset and the first shifting element; whereas a third shifting element associated with the main transmission is connected either between the sun gear of the third planetary gearset and the ring gear of the third planetary gearset or between the sun gear of the third planetary gearset and the carrier of the third planetary gearset or between the carrier of the third planetary gearset and the ring gear of the third planetary gearset; whereas a fourth shifting element associated with the main transmission is connected between the ring gear of the third planetary gearset and the drive-input-side shaft of the group transmission for a motor vehicle; whereas a fifth shifting element associated with the main transmission is connected either between the carrier of the third planetary gearset and the carrier of the fourth planetary gearset or between the ring gear of the third planetary gearset and the sun gear of the fourth planetary gearset; whereas the carrier of the fifth planetary gearset and the ring gear of the fifth planetary gearset are coupled either to the housing or to one another, depending on shifting elements in the range transmission.

This design of the planetary gearsets of the main transmission and the range transmission and the cross-connection of the shifting elements of the main and range transmissions with the planetary gearsets is advantageous for the provision of a group transmission for a motor vehicle that has a compact structure, high efficiency, a large ratio spread and a large number of gears with an almost geometrical gear gradation.

Preferably, the shifting elements of the main transmission are frictional shifting elements and the shifting elements of the range transmission are interlocking shifting elements. Accordingly, the shifting elements of the main transmission are preferably in the form of powershift shifting elements. The shifting elements of the range transmission are preferably interlocking shifting elements.

BRIEF DESCRIPTION OF THE DRAWINGS

Preferred further developments emerge from the description given below. Example embodiments of the invention, to which it is not limited, are explained in greater detail with reference to the drawings, which show:

FIG. 2: A shifting matrix for the motor vehicle group transmission of FIG. 1;

FIG. 3: A further shifting matrix for the motor vehicle group transmission of FIG. 1;

DETAILED DESCRIPTION OF THE PREFERRED EMBODIMENTS

Figure 1:
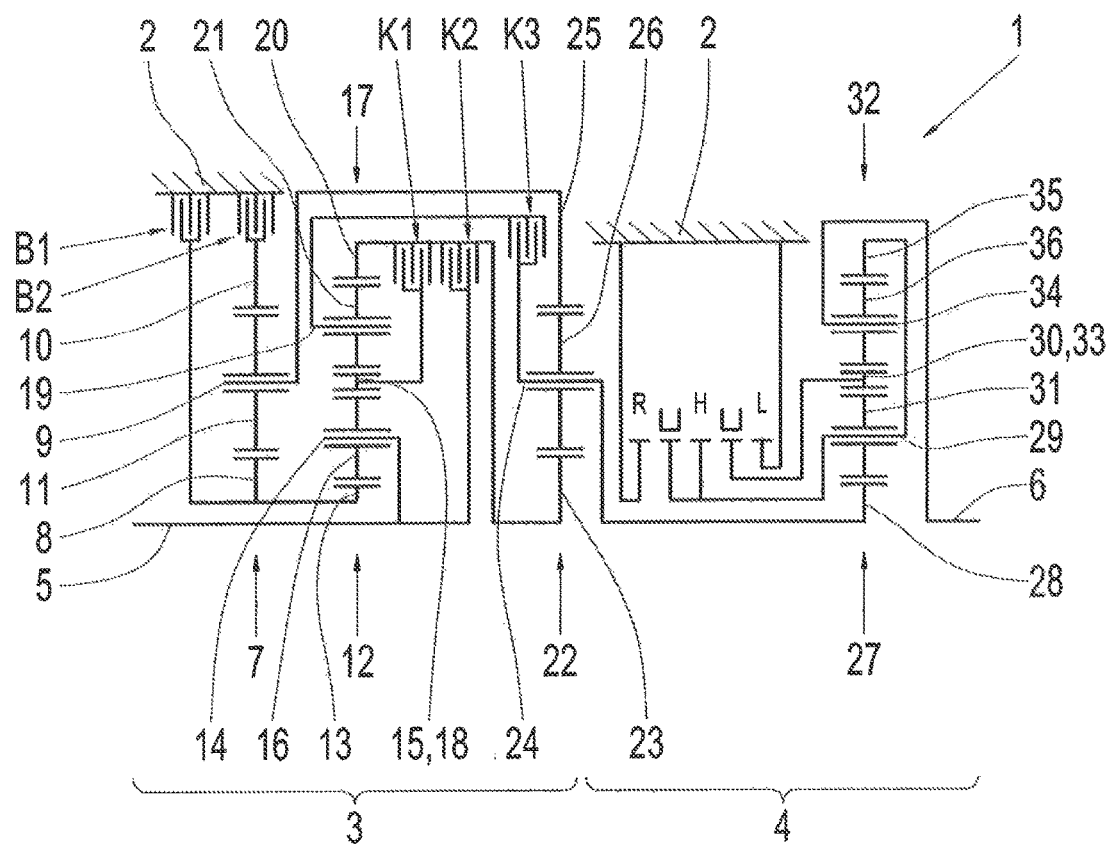
FIG. 1: A schematic representation of a first motor vehicle group transmission according to the invention.

FIG. 1 shows a first example embodiment of a group transmission 1 for a motor vehicle. The motor vehicle group transmission 1 according to FIG. 1 comprises a housing 2, a main transmission 3 and a range transmission 4 having its drive input side connected downstream from the main transmission 3. The main transmission 3 of the motor vehicle group transmission 1 has a drive-input-side shaft 5 and the range transmission 4 of the motor vehicle group transmission 1 has a drive-output-side shaft 6.

The main transmission 3 comprises four planetary gear assemblies or planetary gearsets 7, 12, 17 and 22, and five shifting elements B1, B2, K1, K2 and K3, which in the preferred example embodiment illustrated are all frictional powershift elements. As will be described in detail below, each of the planetary gear assemblies 7, 12, 17 and 22 of the main transmission 3 comprises a sun gear, a carrier, a planetary gearwheel mounted on the carrier and a ring gear.

The range transmission 4 comprises two planetary gear assemblies or planetary gearsets 27 and 32 and three shifting elements R, H and L, such that in the example embodiment shown all the shifting elements R, H and L are interlocking shifting elements.

As described in detail below, with such a motor vehicle group transmission 1 the combination of the main transmission 3 and the range transmission 4 can provide a large number of gears with a large ratio spread, high efficiency and a compact structure, with an approximately geometrical gear gradation, namely at least 13 forward gears and at least 8 reverse gears.

In the description that follows the term planetary gear assembly is used. Planetary gear assemblies are also called planetary gearsets.

In the example embodiment of FIG. 1 the first planetary gear assembly 7 associated with the main transmission 3 comprises a sun gear 8, a carrier 9, a ring gear 10 and a planetary gearwheel 11 mounted on the carrier 9.

The second planetary gear assembly 12 associated with the main transmission 3 comprises a sun gear 13, a carrier 14, a ring gear 15 and a planetary gearwheel 16 mounted on the carrier 14.

The third planetary gear assembly 17 associated with the main transmission 3, which in the example embodiment illustrated by FIG. 1 is positioned radially next to the second planetary gear assembly 12, also comprises a sun gear 18, a carrier 19, a ring gear 20 and a planetary gearwheel 21 mounted on the carrier 19, wherein the ring gear 15 of the second planetary gear assembly 12 and the sun gear 18 of the third planetary gear assembly 17 consist of one and the same component and are therefore permanently coupled.

The fourth planetary gear assembly 22 associated with the main transmission 3 comprises a sun gear 23, a carrier 24, a ring gear 25 and a planetary gearwheel 26 mounted on the carrier 24.

In addition to the four planetary gear assemblies 7, 12, 17, 22 the motor vehicle group transmission 1 comprises two planetary gear assemblies 27 and 32 of the range transmission 4.

Thus, the fifth planetary gear assembly 27 associated with the range transmission 4 comprises a sun gear 28, a carrier 29, a ring gear 30 and a planetary gearwheel 31 mounted on the carrier 29, whereas the sixth planetary gear assembly 32 associated with the range transmission 4 also comprises a sun gear 33, a carrier 34, a ring gear 35 and a planetary gearwheel 36 mounted on the carrier 34.

In the example embodiment of FIG. 1 the two planetary gear assemblies 27 and 32 of the range transmission 4 are in turn arranged radially next to one another, in such manner that the ring gear 30 of the fifth planetary gear assembly 27 and the sun gear 33 of the sixth planetary gear assembly 32 consist of one and the same component and are accordingly permanently coupled.

The carrier 14 of the second planetary gear assembly 12 of the motor vehicle group transmission 1 associated with the main transmission 3 is permanently coupled to the drive-input-side shaft 5 of the motor vehicle group transmission.

As already stated, the ring gear 15 of the second planetary gear assembly 12 is coupled permanently to the sun gear 18 of the third planetary gear assembly 17, while in the example embodiment of FIG. 1 the ring gear 15 of the second planetary gear assembly 12 and the sun gear 18 of the third planetary gear assembly 17 consist of one and the same component.

The carrier 24 of the fourth planetary gear assembly 22 of the main transmission 3 is permanently coupled to the sun gear 28 of the fifth planetary gear assembly 27 associated with the range transmission 4. As already stated, the ring gear 30 of the fifth planetary gear assembly 27 and the sun gear 33 of the sixth planetary gear assembly 32 are permanently coupled to one another, and in addition the carrier 29 of the fifth planetary gear assembly 27 and the ring gear 35 of the sixth planetary gear assembly 32 are permanently coupled to one another. The carrier 34 of the sixth planetary gear assembly 32, which is part of the range transmission 4, is permanently coupled to the drive-output-side shaft 6 of the motor vehicle group transmission 1.

A first shifting element B1 of the main transmission 3 is connected between the housing 2 and the sun gear 8 of the first planetary gear assembly 7, to be specific in such manner that when the first shifting element B1 is closed, the sun gear 8 of the first planetary gear assembly 7 is coupled to the housing 2, whereas in contrast, when the first shifting element shifting element B1 is open, the sun gear 8 of the first planetary gear assembly 7 is decoupled from the housing 2 of the motor vehicle group transmission 1.

In the example embodiment of FIG. 1, a second shifting element B2 of the main transmission 3 is connected between the ring gear 10 of the first planetary gear assembly 7 and the housing 2, namely in such manner that when the second shifting element B2 is closed, the ring gear 10 of the first planetary gear assembly 7 is connected to the housing 2, whereas in contrast, when this second shifting element B2 is open the ring gear 10 of the first planetary gear assembly 7 is decoupled from the housing 2 of the motor vehicle group transmission 1. When, as shown in FIG. 1, the second shifting element B2 is connected between the ring gear 10 of the first planetary gear assembly 7 and the housing 2, the carrier 9 of the first planetary gear assembly 7 is permanently coupled to the ring gear 25 of the fourth planetary gear assembly 22 of the main transmission 3, and in addition the sun gear 8 of the first planetary gear assembly 7 can be coupled to the housing 2 with interposition exclusively of the first shifting element B1.

In the example embodiment shown in FIG. 1 a third shifting element K1 of the main transmission 3 is connected between the sun gear 18 of the third planetary gear assembly 17 and the ring gear 20 of the third planetary gear assembly 17. When this third shifting element K1 is closed, the sun gear 18 and the ring gear 20 of the third planetary gear assembly 17 are coupled to one another.

A fourth shifting element K2 of the main transmission 3 is connected between the ring gear 20 of the third planetary gear assembly 17 and the drive-input-side shaft 5 of the motor vehicle group transmission 1. When this fourth shifting element K2 is closed, a connection is formed between the drive-input-side shaft 5 and the ring gear 20 of the third planetary gear assembly 17.

In the example embodiment shown in FIG. 1, a fifth shifting element K3 of the main transmission 3 is connected between the carrier 19 of the third planetary gear assembly 17 and the carrier 24 of the fourth planetary gear assembly 22. When this fifth shifting element K3 is open, these two carriers 19 and 24 of the two planetary gear assemblies 17 and 22 are separated from one another. In contrast, when this fifth shifting element K3 is closed, the two carriers 19 and 24 respectively of the third planetary gear assembly 17 and the fourth planetary gear assembly 22 are coupled to one another. When, as shown in FIG. 1, the fifth shifting element K3 is connected between the carrier 19 of the third planetary gear assembly 17 and the carrier 24 of the fourth planetary gear assembly 22, the ring gear 20 of the third planetary gear assembly 17 is permanently coupled to the sun gear 23 of the fourth planetary gear assembly 22.

The carrier 29 of the fifth planetary gear assembly 27 of the range transmission 4 and the ring gear 30 of the fifth planetary gear assembly 27 of the range transmission 4 are coupled either to the housing 2 or to one another, depending on the shifting elements R, H and L of the range transmission 4.

When the shifting element H for the 'high' driving stage of the range transmission 4 is closed, the carrier 29 and the ring gear 30 of the fifth planetary gear assembly 27 are coupled to one another. When the shifting element L for the 'low' driving stage of the range transmission 4 is closed, then exclusively the ring gear 30 of the fifth planetary gear assembly 27 but not the carrier 29 is coupled to the housing 2.

When the shifting element R for reverse gears is closed, then exclusively the carrier 29 of the fifth planetary gear assembly 27 but not the ring gear 30 thereof is coupled to the housing 2.

As shown by the shifting matrix in FIG. 2, with the motor vehicle group transmission 1 according to FIG. 1, fifteen forward gears V1 to V15 and eight reverse gears R1 to R8 can be obtained. Those of the shifting elements B1, B2, K1, K2, K3, R, L and H of the motor vehicle group transmission 1 which are in each case closed in the respective gears are indicated in the shifting matrix with an 'X', and it can be seen that the shifting matrix according to FIG. 2 provides 15 forward gears and 8 reverse gears. The transmission ratios i and the gear intervals φ shown in the shifting matrix of FIG. 2 are obtained when for the first planetary gear assembly 7 a stationary gear transmission ratio i0=−3.290, for the second planetary gear assembly 12 a stationary gear transmission ratio i0=−2.820, for the third planetary gear assembly 17 a stationary gear transmission ratio i0=−1.450, for the fourth planetary gear assembly 22 a stationary gear transmission ratio i0=−3.650, for the fifth planetary gear assembly 27 of the range transmission 4 a stationary gear transmission ratio i0=−2.800 and for the sixth planetary gear assembly 32 a stationary gear transmission ratio i0=−1.500 are chosen.

Another shifting matrix with thirteen forward gears V1 to V13 and eight reverse gears R1 to R8, which can be obtained with the motor vehicle group transmission 1 according to FIG. 1, is shown in FIG. 3. With the shifting matrix according to FIG. 3, 13 forward gears and 8 reverse gears can be obtained. Again, those of the shifting elements B1, B2, K1 K2, K3, R, L and H of the motor vehicle group transmission 1 which are in each case closed in the respective gears are indicated in the shifting matrix with an 'X'. The transmission ratios i and the gear intervals Φ shown in the shifting matrix of FIG. 3 are obtained when for the first planetary gear assembly 7 a stationary gear transmission ratio i0=−3.290, for the second planetary gear assembly 12 a stationary gear transmission ratio i0=−2.820, for the third planetary gear assembly 17 a stationary gear transmission ratio i0=−1.450, for the fourth planetary gear assembly 22 a stationary gear transmission ratio i0=−3.650, for the fifth planetary gear assembly 27 a stationary gear transmission ratio i0=−1.600 and for the sixth planetary gear assembly 32 a stationary gear transmission ratio i0=−3.100 are chosen.

The stationary gear transmission ratios of the planetary gear assemblies 7, 12, 17, 22, 27 and 32 can in principle be chosen freely and can be adapted to the intended use of the motor vehicle group transmission 1.

Theoretically, with the transmission structure of the FIG. 16 forward gears and 8 reverse gears can be obtained. The transmission structure is characterized by high gearing efficiency, low structural complexity and a compact configuration. The gear intervals and gear gradation are approximately geometrical. A large number of powershiftable gears can be provided. The component loads are low. In the lower gears multiple shifts are possible. The transmission structure has a large spread. A parking lock function can be realized if the two shifting elements L and R of the range transmission 4 are closed at the same time.

As the starting element for the motor vehicle group transmission 1 a hydrodynamic torque converter, a hydrodynamic clutch, an additional starting clutch, an integrated starting clutch or an additional electric machine can be used.

Basically, an electric machine can be arranged on any shaft of the motor vehicle group transmission 1.

Moreover, basically a freewheel to the housing or to another shaft of the motor vehicle group transmission 1 can be arranged on any shaft.

As already stated, according to FIG. 1 the shifting elements B1, B2, K1, K2 and K3 of the main transmission 3 are all frictional shifting elements and the shifting elements R, H and L of the range transmission 4 are all interlocking shifting elements. Although this design is advantageous, it is basically possible, depending on what is required from the motor vehicle group transmission, to make all the shifting elements either as interlocking or as frictional shifting elements. However, to ensure the powershifting ability of the main transmission, the shifting elements of the main transmission 3 are preferably in the form of frictional shifting elements. If for the motor vehicle group transmission 1 a reversal from forward to backward or a powershift between the two groups of the group transmission is required, then the shifting elements R, H and L of the range transmission too can be in the form of frictional shifting elements.

FIGS. 4 to 13 show modifications of the motor vehicle group transmission 1 shown in FIG. 1. Below, only such details will be described by which these modifications differ from the embodiment of FIG. 1. As regards other details, to avoid unnecessary repetitions reference should be made to the descriptions given above. The same indexes are used to denote the same assemblies.

Figure 4:
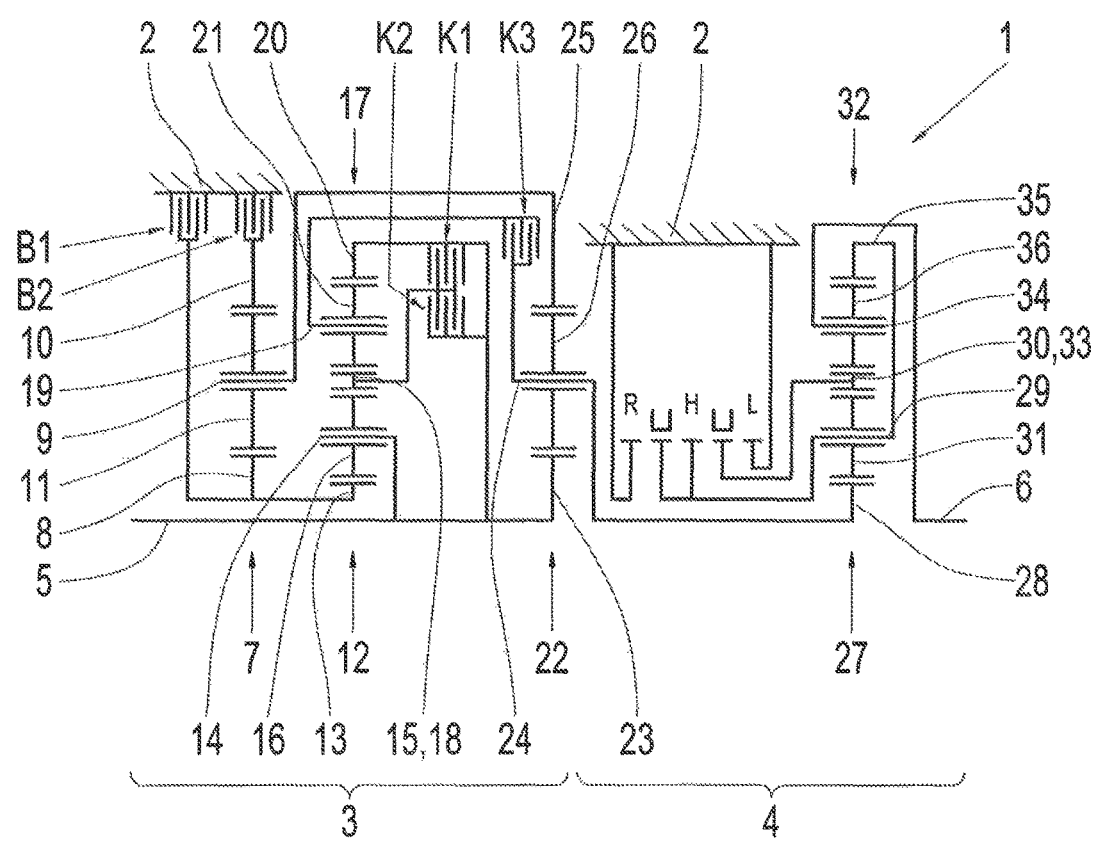
FIG. 4: A schematic representation of a second motor vehicle group transmission according to the invention.

In the variant shown in FIG. 4, in contrast to FIG. 1, the two shifting elements K1 and K2 are not arranged axially next to one another, but radially nested one over the other. As for the other details, the example embodiment of FIG. 4 is the same as the example embodiment of FIG. 1.

Figure 5:
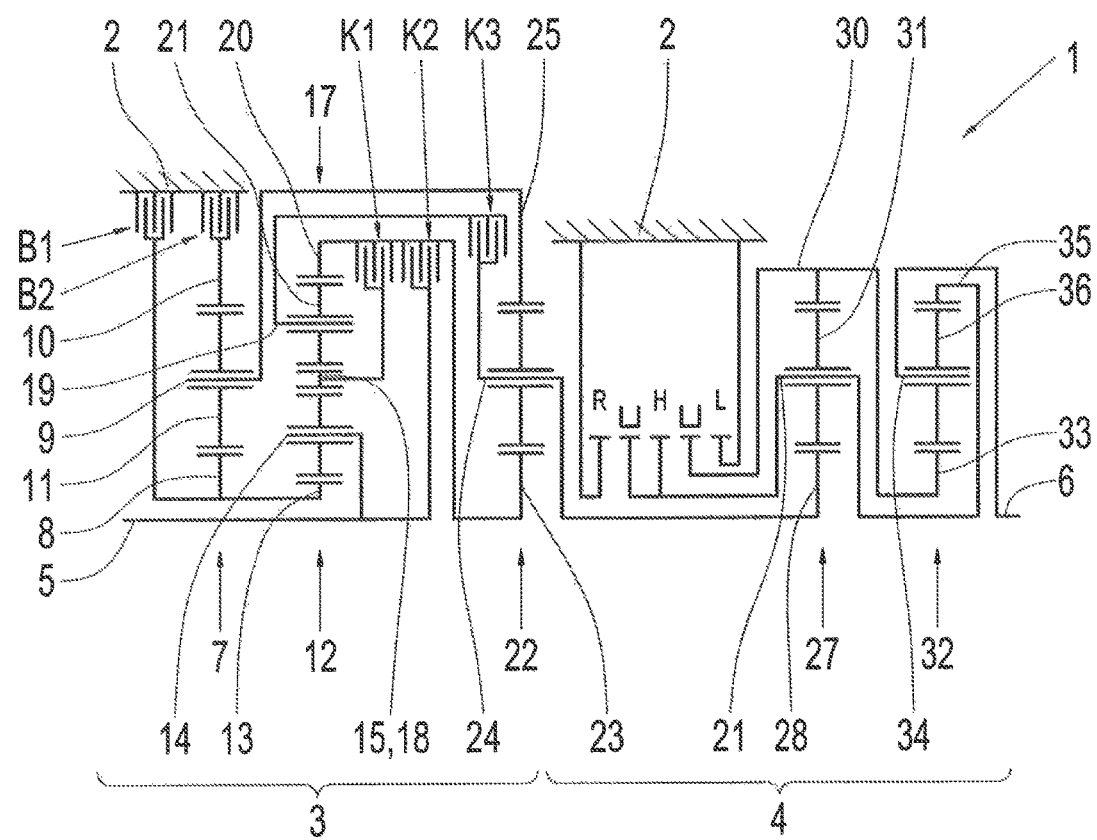
FIG. 5: A schematic representation of a third motor vehicle group transmission according to the invention.

FIG. 5 shows a further variant of the motor vehicle group transmission 1, the example embodiment of FIG. 5 differing from the example embodiment of FIG. 1 in that the two planetary gear assemblies 27 and 32 of the range transmission 4 are not radially nested, but rather, positioned axially one behind the other. In this case, also, the ring gear 30 of the fifth planetary gear assembly 27 is coupled fixed to the sun gear 33 of the sixth planetary gear assembly 32, although these two components are made separately.

Figure 7:
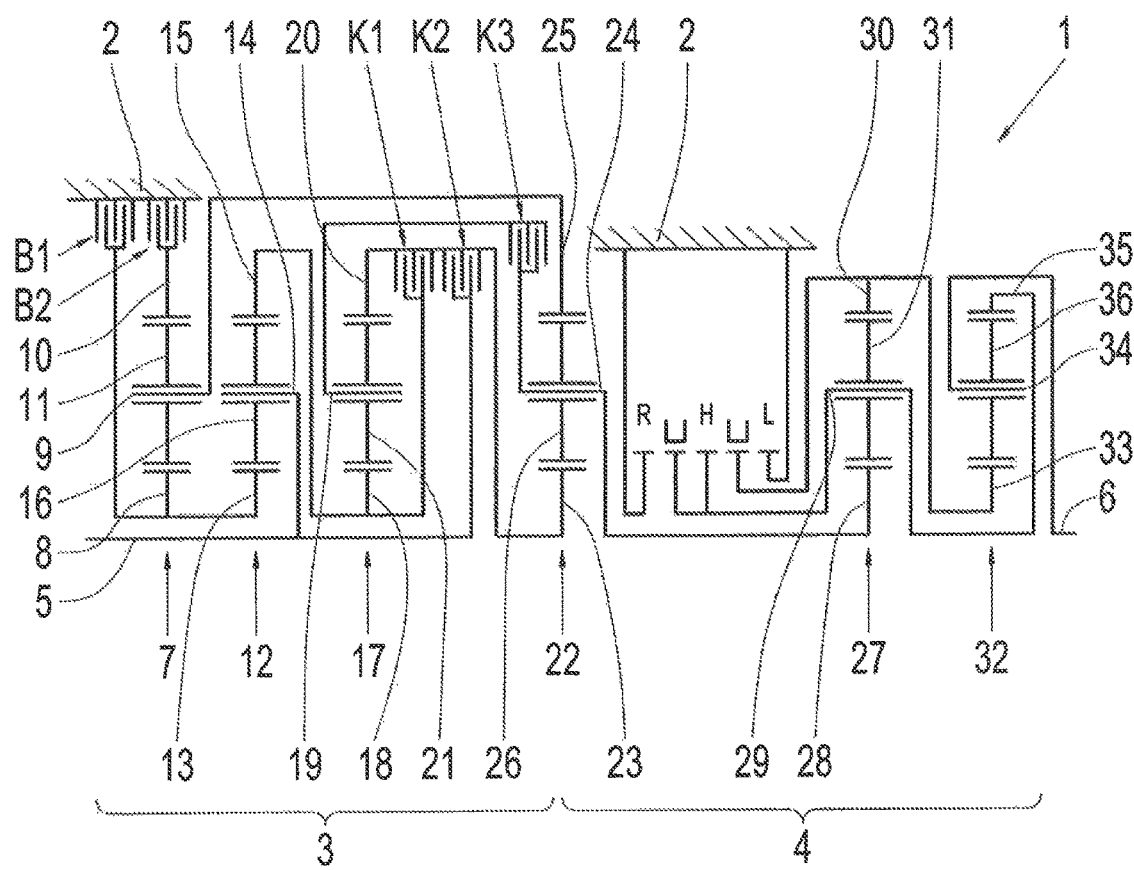
FIG. 7: A schematic representation of a fifth motor vehicle group transmission according to the invention.

In the variant shown in FIG. 7, compared with the variant in FIG. 5 it is also provided that the two planetary gear assemblies 12 and 17 of the main transmission 3, like the planetary gear assemblies 27 and 32 of the range transmission 4, are not radially nested, but rather, arranged axially next to one another. In this case, according to FIG. 4 the ring gear 15 of the second planetary gear assembly 12 and the sun gear 18 of the third planetary gear assembly 17 are made as separate units and permanently coupled to one another.

Figure 6:
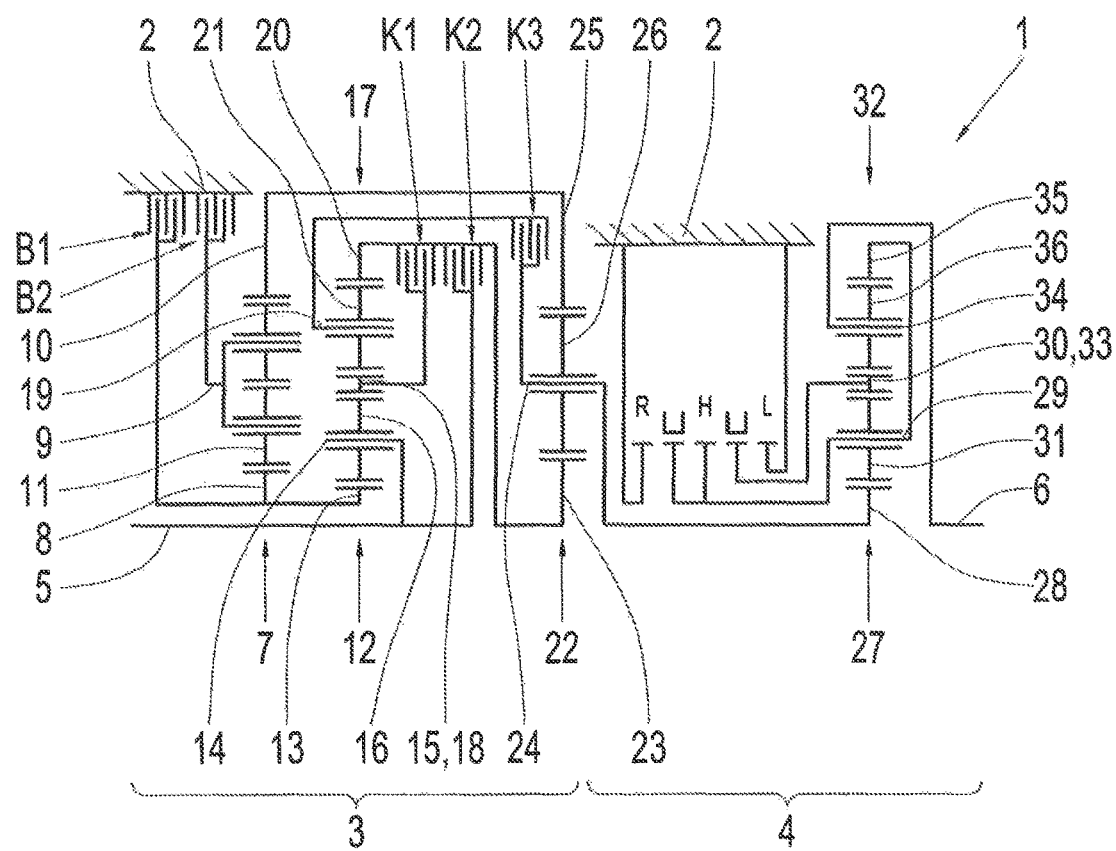
FIG. 6: A schematic representation of a fourth motor vehicle group transmission according to the invention.

A further variant of FIG. 1 is shown in FIG. 6, the variant in FIG. 6 differing from FIG. 1 in that as the first planetary gear assembly 7 of the main transmission 3, a plus planetary gearset is used, This is made possible by exchanging the ring gear and carrier connection and by increasing the value of the stationary gear transmission ratio by the value one.

This, in the example embodiment of FIG. 6 the second shifting element B2 is connected between the carrier 9 of the first planetary gear assembly 7 and the housing 2, whereas then the ring gear 10 of the first planetary gear assembly 7 is coupled permanently to the ring gear 25 of the fourth planetary gear assembly 22, and in addition, the sun gear 8 of the first planetary gear assembly 7 can be coupled to the housing 2 with interposition exclusively of the first shifting element B1.

Figure 6A:
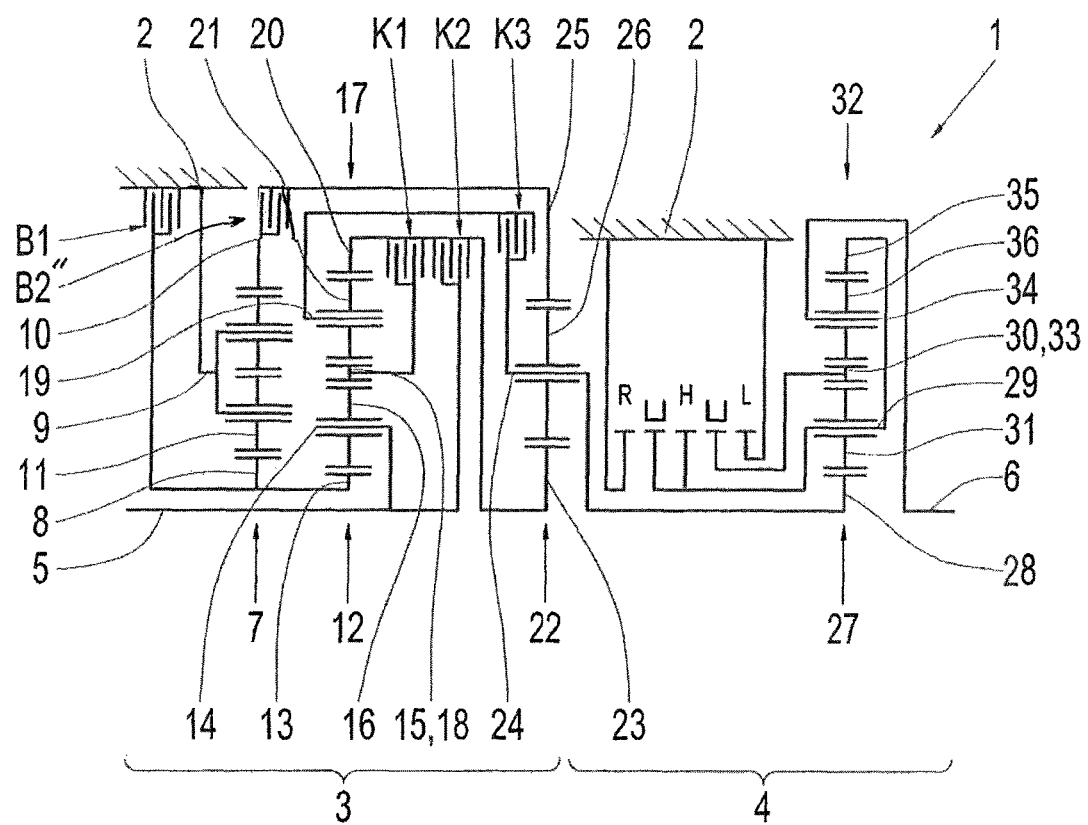
FIG. 6A: A schematic representation showing a first variation of the fourth motor vehicle group transmission according to the invention.

FIG. 6A is a schematic representation, similar to FIG. 6, showing first planetary gearset 7 as a plus planetary gearset, with the second shifting element B2" of the main transmission 3 facilitating connection between the ring gear 10 of the first planetary gearset 7 and the ring gear 25 of the fourth planetary gearset 22.

Figure 6B:
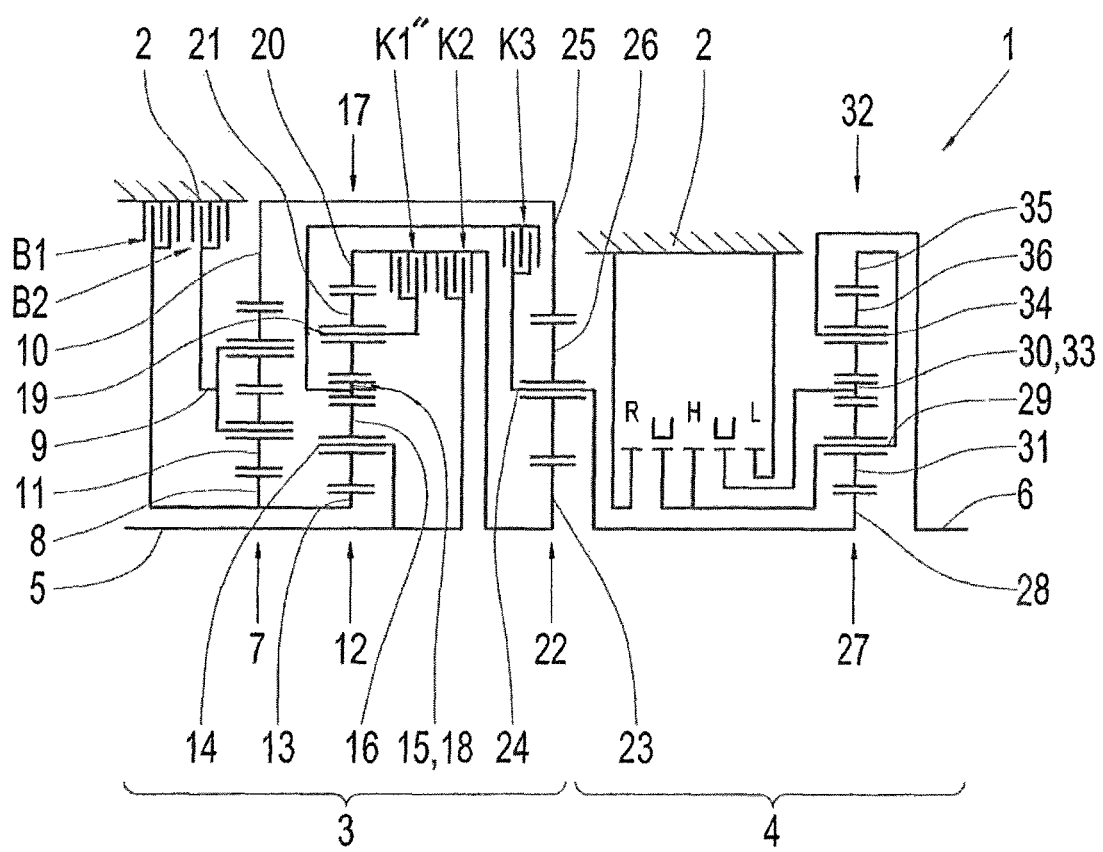
FIG. 6B: A schematic representation showing a second variation of the fourth motor vehicle group transmission according to the invention.

FIG. 6B is a schematic representation, similar to FIG. 6, showing first planetary gearset 7 as a plus planetary gearset, with the second shifting element K1" of the main transmission 3 facilitating connection between the carrier 19 of the third planetary gearset 17 and the ring gear 20 of the third planetary gearset 17.

Figure 8:
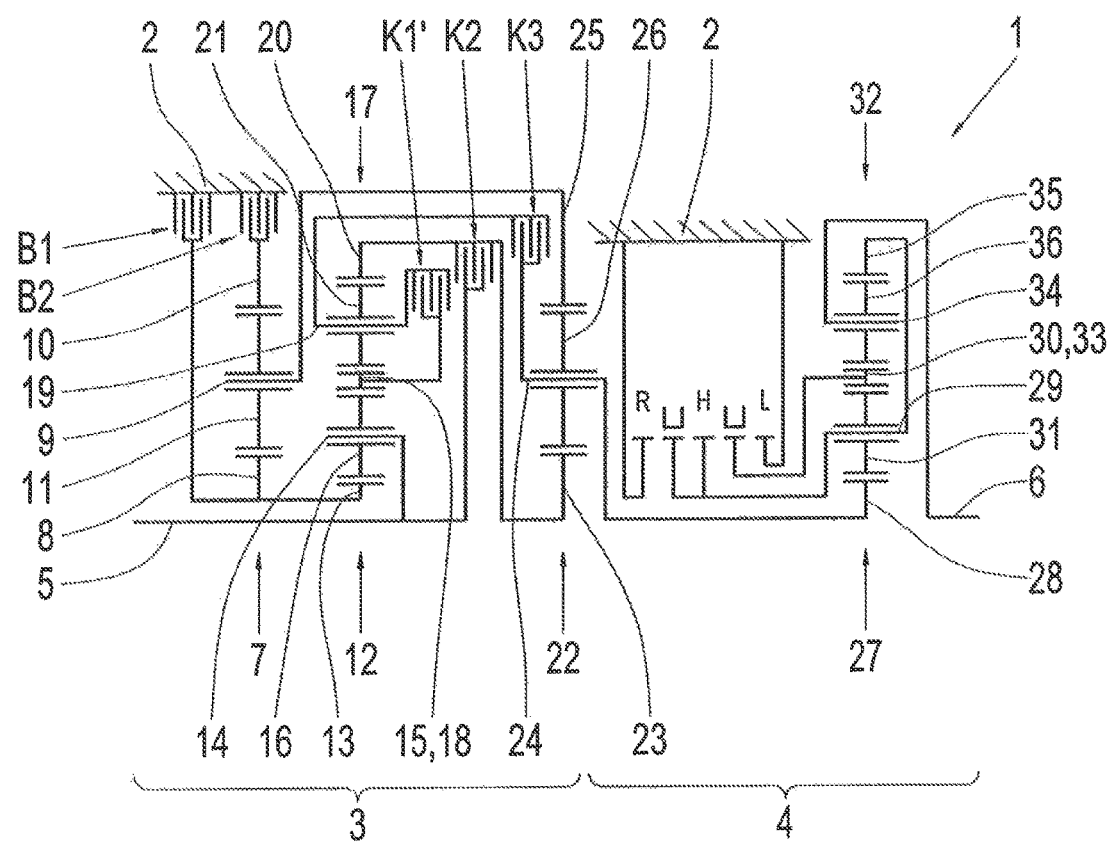
FIG. 8: A schematic representation of a sixth motor vehicle group transmission according to the invention.
Figure 9:
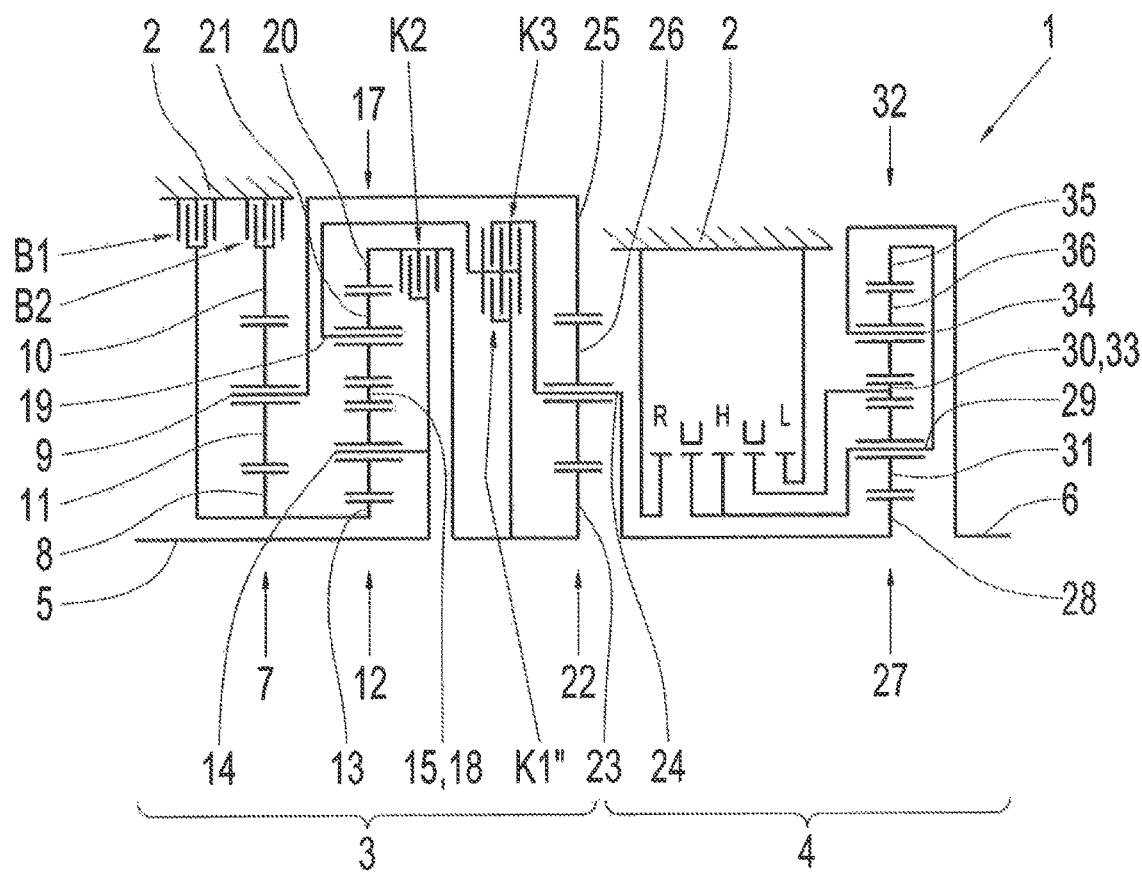
FIG. 9: A schematic representation of a seventh motor vehicle group transmission according to the invention.
Figure 10:
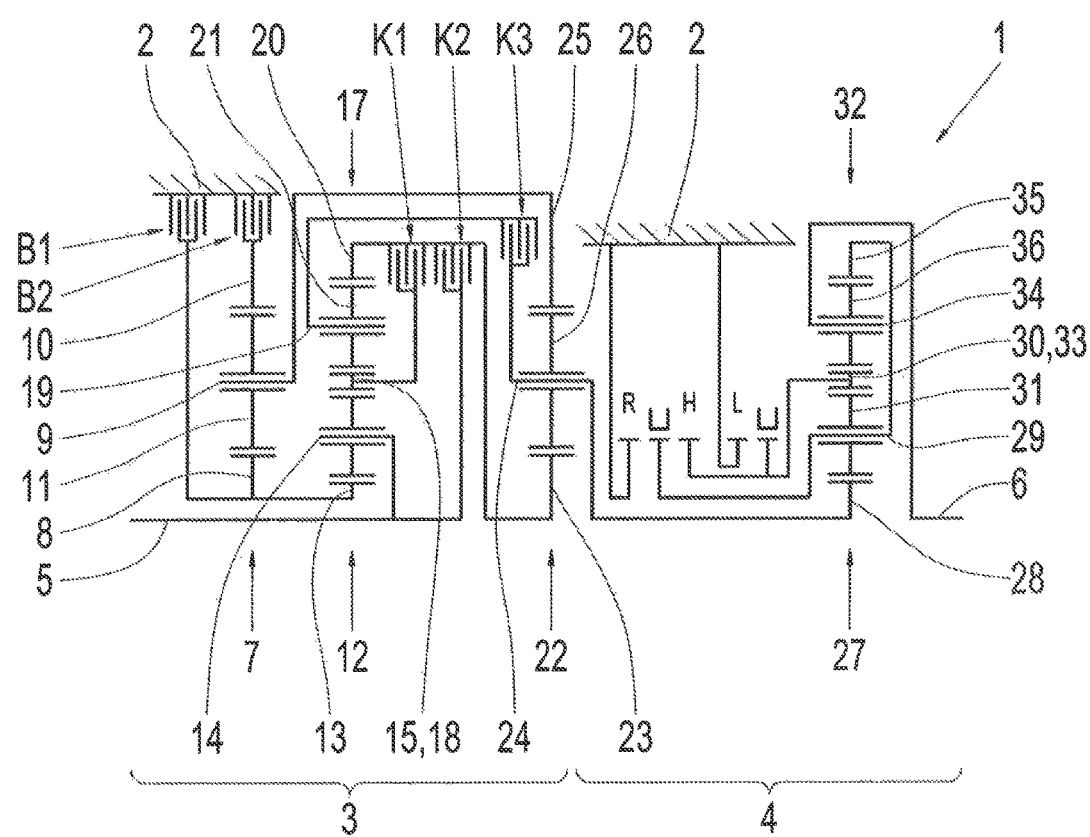
FIG. 10: A schematic representation of an eighth motor vehicle group transmission according to the invention.

In the example embodiments of FIGS. 1 and 4 to 7, the third shifting element K1 is in each case connected between the sun gear 18 of the third planetary gear assembly 17 and the ring gear 20 of the same. In contrast, FIG. 8 shows a variant of the invention in which the shifting element K1' is connected between the sun gear 18 of the third planetary gear assembly 17 and the carrier 19 thereof, so that when this third shifting element K1' is closed, the sun gear 18 and the carrier 19 of the third planetary gear assembly 17 are blocked, Compared with this, in the example embodiments of FIGS. 1 and 4 to 7, when the shifting element K1 is closed the sun gear 18 and the ring gear 20 of the third planetary gear assembly 17 are blocked. In a variant according to FIG. 9, the third shifting element K1" is connected between the carrier 19 of the third planetary gear assembly 17 and the ring gear 20 thereof.

Two of the three shifting elements R, H and L can be combined in a dual shifting element. For example, the shifting element H and the shifting element L can be combined in a dual shifting element, or alternatively, the shifting elements R and H and the shifting elements R and L can be combined in a dual shifting element. Thus, FIG. 1 shows a motor vehicle group transmission 1 in which the two shifting elements R and H are combined in a dual shifting element.

Figure 11:
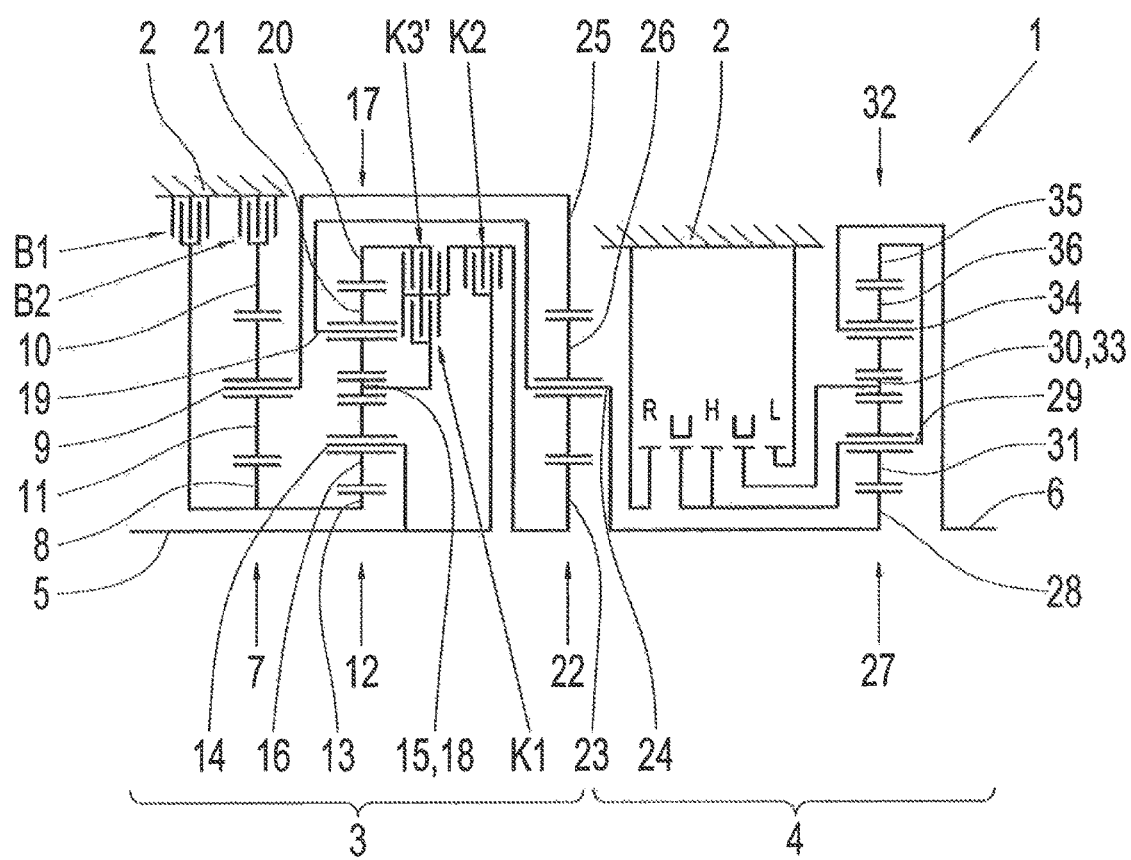
FIG. 11: A schematic representation of a ninth motor vehicle group transmission according to the invention.
Figure 12:
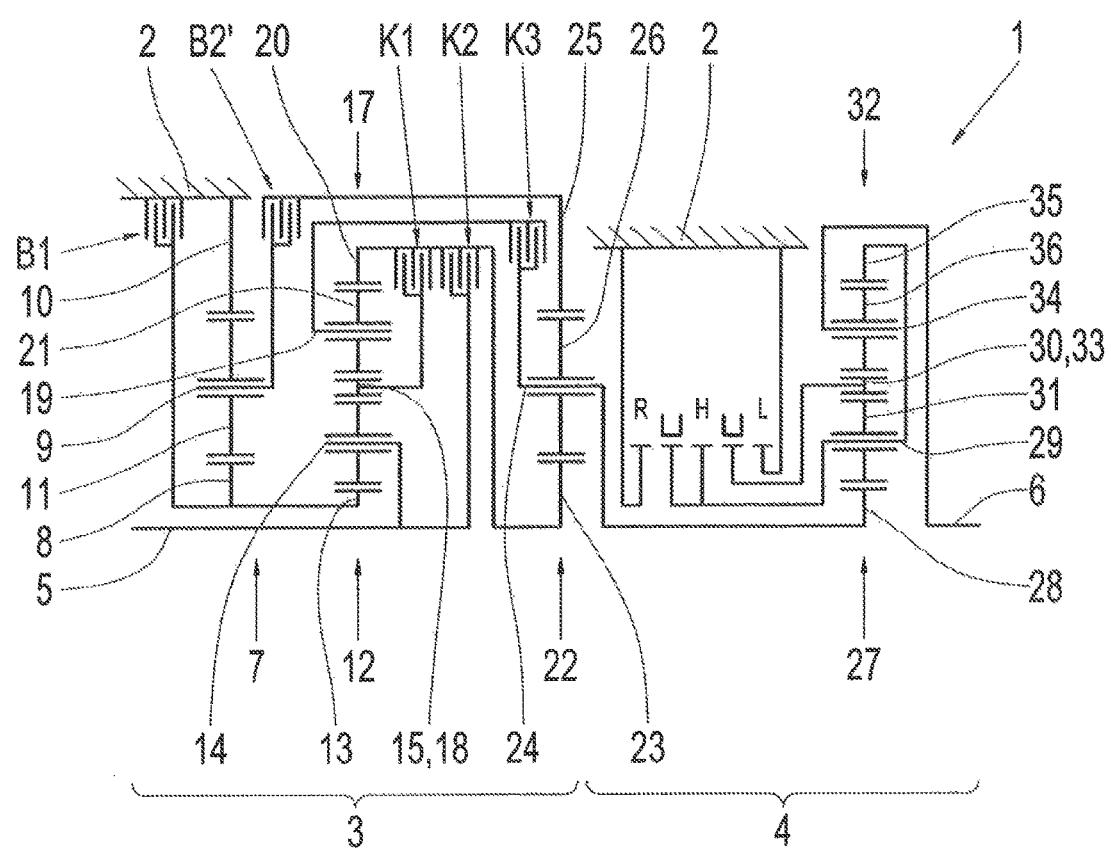
FIG. 12: A schematic representation of a tenth motor vehicle group transmission according to the invention.
Figure 13:
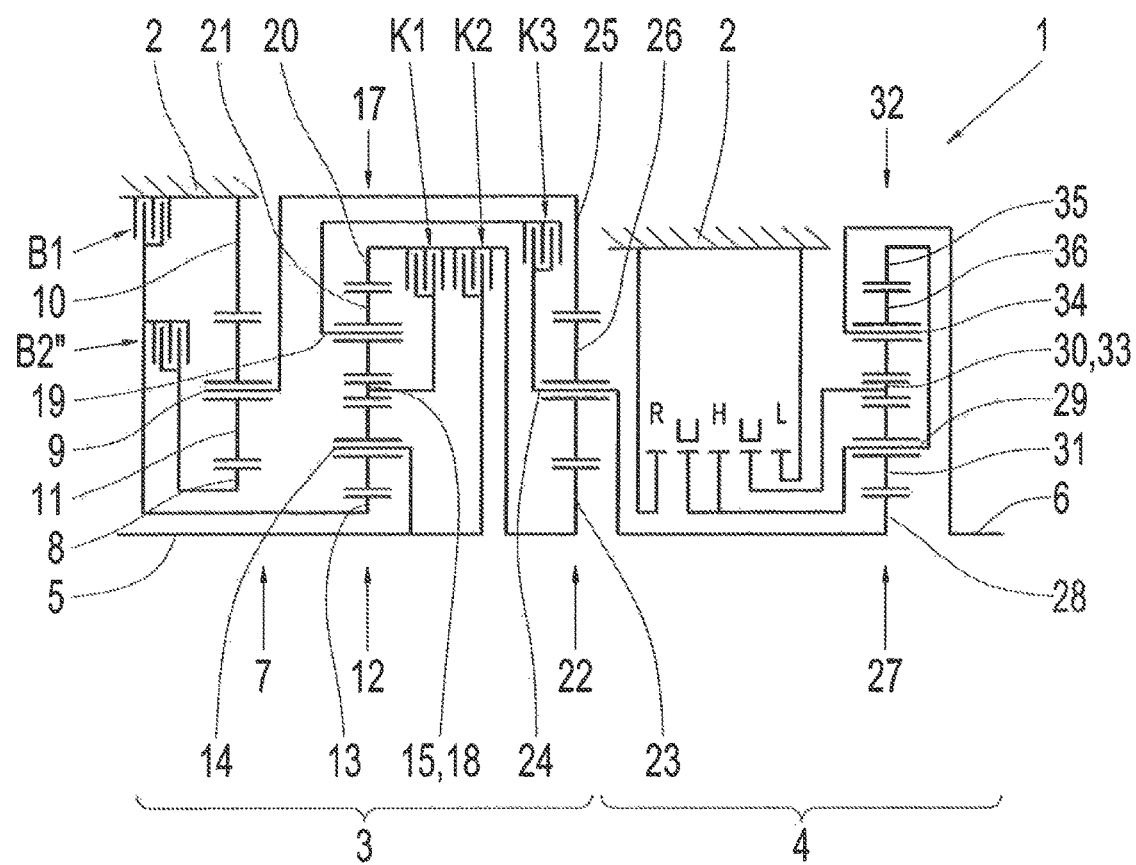
FIG. 13: A schematic representation of a further motor vehicle group transmission according to the invention.

Further design features of the motor vehicle group transmission 1 according to the invention are shown in FIGS. 11, 12 and 13.

The example embodiment of FIG. 1 differs from the example embodiment of FIG. 11 in the positioning of the fifth shifting element K3'.

Thus, in the variant shown in FIG. 11 the shifting element K3' is connected between the ring gear 20 of the third planetary gear assembly 17 and the sun gear 23 of the fourth planetary gear assembly 22, so that the carrier 19 of the third planetary gear assembly 17 is then permanently coupled to the carrier 24 of the fourth planetary gear assembly 22.

Alternatively to being arranged on the carrier, the fifth shifting element K3 can likewise be arranged on the ring gear or even on the sun gear (not shown), Compared with the arrangement of the shifting element K3 on the sun gear its arrangement on the carrier or on the ring gear is less advantageous, since the engagement of the third planetary gear assembly 17 on the second planetary gear assembly 12 is made more difficult.

FIGS. 12 and 13 show designs of the motor vehicle group transmission 1 which differ from the embodiment of FIG. 1 in the positioning of the second shifting element B2.

Thus, in the embodiment shown in FIG. 12 it is provided that the second shifting element B2' of the main transmission 3 is connected between the carrier 9 of the first planetary gear assembly 7 and the ring gear 25 of the fourth planetary gear assembly 22. In this case the ring gear 10 of the first planetary gear assembly 7 is permanently coupled to the housing 2 and in addition the sun gear 8 of the first planetary gear assembly 7 can be coupled to the housing 2 with interposition exclusively of the first shifting element B1.

In the embodiment of FIG. 13 the second shifting element B2" is connected between the sun gear 8 of the first planetary gear assembly 7 and the first shifting element B1, so that the sun gear 8 of the first planetary gear assembly 7 is only coupled to the housing 2 when both of the shifting elements B1 and B2" are closed. In this case the ring gear 10 of the first planetary gear assembly 7 is permanently coupled to the housing 2 and in addition the carrier 9 of the first planetary gear assembly 7 is permanently coupled to the ring gear 25 of the fourth planetary gear assembly 22.

In all the embodiment variants shown, the first planetary gear assembly 7 of the main transmission 3 is that planetary gear assembly of the motor vehicle group transmission 1 which is positioned at a drive-input-side end of the housing 2.

The fourth planetary gear assembly 22 is that planetary gear assembly of the motor vehicle group transmission 1 which is positioned close to a drive-output-side end of the main transmission 3.

The second planetary gear assembly 12 and the third planetary gear assembly 17 of the main transmission 3 are positioned between the first planetary gear assembly 7 and the fourth planetary gear assembly 22, either nested radially or axially one behind the other.

The two planetary gear assemblies 27 and 32 of the range transmission 4 are arranged close to a drive-output-side end of the housing 2, and are either nested radially or positioned axially one behind the other, and when the two planetary gear assemblies 27 and 32 of the range transmission 4 are arranged axially one behind the other, the sixth planetary gear assembly 32 is positioned close to the drive-output-side end of the housing 2.

This geometrical positioning of the planetary gear assemblies is particularly for ensuring a compact configuration. However, any geometrical positioning of the planetary gear assemblies can be varied provided that it enables the elements to be connected in the manner described.

Like the group transmission of FIG. 1, so too the group transmissions of FIGS. 4 to 13 can operate in accordance with the shifting matrixes of FIGS. 2 and 3.

All the motor vehicle group transmissions 1 are characterized by good gearing efficiency, little structural complexity, compact structure and a large number of gears with almost geometrical gear gradation. In each case a large gear spread can be obtained, In each case several reverse gears are available.

INDEXES

1 Motor vehicle group transmission
2 Housing
3 Main transmission
4 Range transmission
5 Shaft
6 Shaft
7 Planetary gear assembly/planetary gearset
8 Sun gear
9 Carrier
10 Ring gear
11 Planetary gearwheel
12 Planetary gear assembly/planetary gearset
13 Sun gear
14 Carrier
15 Ring gear
16 Planetary gearwheel
17 Planetary gear assembly/planetary gearset
18 Sun gear
19 Carrier
20 Ring gear
21 Planetary gearwheel
22 Planetary gear assembly/planetary gearset
23 Sun gear
24 Carrier
25 Ring gear
26 Planetary gearwheel
27 Planetary gear assembly/planetary gearset
28 Sun gear
29 Carrier
30 Ring gear
31 Planetary gearwheel
32 Planetary gear assembly/planetary gearset
33 Sun gear
34 Carrier
35 Ring gear
36 Planetary gearwheel
B1 Shifting element
B2, B2', B2" Shifting element
K1 Shifting element
K2 Shifting element
K3, K3' Shifting element
K4 Shifting element
R Shifting element
H Shifting element
L Shifting element

The invention claimed is:
1. A motor vehicle group transmission (1) comprising:
at least one housing (2);
a main transmission (3) and a range transmission (4) being connected downstream from the main transmission (3);
the main transmission (3) comprising at least first, second, third, and fourth planetary gearsets (7, 12, 17, 22), and at least first, second, third, fourth and fifth shifting elements (B1, B2, K1, K2, K3);
the range transmission (4) comprising at least fifth and sixth planetary gearsets (27, 32), and at least sixth, seventh and eighth shifting elements (R, L, H);
each of the first, the second, the third, the fourth, the fifth and the sixth planetary gearsets comprising a sun gear (8, 13, 18, 23, 28, 33), a carrier (9, 14, 19, 24, 29, 34), a planetary gearwheel (11, 16, 21, 26, 31, 36) mounted on the respective carrier (9, 14, 19, 24, 29, 34) and a ring gear (10, 15, 20, 25, 30, 35); and
the main transmission (3) and the range transmission (4) in combination together providing at least thirteen forward gears and at least first, second, third, fourth, fifth, sixth, seventh and eighth reverse gears;
each of the at least thirteen forward gears being implementable by selective engagement of three of the first, the second, the third, the fourth and the fifth shifting elements and engagement of either the sixth or the seventh shifting elements; and one of the first, the second, the third, the fourth, the fifth, the sixth, the seventh and the eighth reverse gears being implementable by engagement only one shifting element.

2. A motor vehicle group transmission (1) comprising:

at least one housing (2);

a main transmission (3) and a range transmission (4) being connected downstream from the main transmission (3);

the main transmission (3) comprising at least first, second, third, and fourth planetary gearsets (7, 12, 17, 22), and at least first, second, third, fourth and fifth shifting elements (B1, B2 K1, K2, K3);

the range transmission (4) comprising at least fifth and sixth planetary gearsets (27, 32), and at least sixth, seventh and eighth shifting elements (R, L, H);

each of the first, the second, the third, the fourth, the fifth and the sixth planetary gearsets comprising a sun gear (18, 13, 18, 23, 28, 33), a carrier (9, 14, 19, 24, 29, 34), a planetary gearwheel (11, 16, 21, 26, 31, 35) mounted on the respective carrier (9, 14, 19, 24, 29, 34) and a ring gear (10, 15, 20, 25, 30, 35); and the main transmission (3) and the range transmission (4) in combination together providing at least thirteen forward gears and at least eight reverse gears;

wherein:

the sun gear (8) of the first planetary gearset (7) of the main transmission (3) is connectable to the housing (2) by engagement of the first shifting element (B1) of the main transmission (3);

the carrier (14) of the second planetary gearset (12) of the main transmission (3) is permanently connected to a drive-input-side shaft (5) of the motor vehicle group transmission;

the ring gear (15) of the second planetary gearset (12) is permanently connected to the sun gear (18) of the third planetary gearset (17) of the main transmission (3);

the carrier (24) of the fourth planetary gearset (22) is permanently connected to the sun gear (28) of the fifth planetary gearset (27) of the range transmission (4);

the ring gear (30) of the fifth planetary gearset (27) is permanently connected to the sun gear (33) of the sixth planetary gearset (32) of the range transmission (4) and the carrier (29) of the fifth planetary gearset (27) is permanently connected to the ring gear (35) of the sixth planetary gearset (32);

the carrier (34) of the sixth planetary gearset (27) is permanently connected to a drive-output-side shaft (6) of the motor vehicle group transmission;

if the first planetary gearset (7) is a minus planetary gearset, then the second shifting element (B2, B2', B2") of the main transmission (3) facilitates connection between one of:

the ring gear (10) of the first planetary gearset (7) with the housing (2), the carrier (9) of the first planetary gearset (7) and the ring gear (25) of the fourth planetary gearset (22), and the sun gear (8) of the first planetary gearset (7) and the first shifting element (B1), or if the first planetary gearset (7) is a plus planetary gearset, then the second shifting element (B2, B2', B2") of the main transmission (3) facilitates connection between one of:

the carrier (9) of the first planetary gearset (7) with the housing (2), the ring gear (10) of the first planetary gearset (7) with the ring gear (25) of the fourth planetary gearset (22), and the sun gear (8) of the first planetary gearset (7) with the first shifting element (B1);

the third shifting element (K1, K1', K1") of the main transmission (3) facilitates connection between one of:

the sun gear (18) of the third planetary gearset (17) and the ring gear (20) of the third planetary gearset (17), the sun gear (18) of the third planetary gearset (17) and the carrier (19) of the third planetary gearset (17), and the carrier (19) of the third planetary gearset (17) and the ring gear (20) of the third planetary gearset (17);

the fourth shifting element (K2) of the main transmission (3) is connected between the ring gear (20) of the third planetary gearset (17) and the drive-input-side shaft (5) of the motor vehicle group transmission;

the fifth shifting element (K3, K3') of the main transmission (3) is connected between either the carrier (19) of the third planetary gearset (17) and the carrier (24) of the fourth planetary gearset (22) or between the ring gear (20) of the third planetary gearset (17) and the sun gear (23) of the fourth planetary gearset (22); and depending on the sixth, the seventh and the eighth shifting elements (R, H, L) of the range transmission (4), the carrier (29) of the fifth planetary gearset (27) and the ring gear (30) of the fifth planetary gearset (27) are coupled either to the housing (2) or to one another.

3. The motor vehicle group transmission according to claim 2, wherein if the second shifting element (B2) is connected between the ring gear (10) of the first planetary gearset (7) and the housing (2), then the carrier (9) of the first planetary gearset (7) is permanently connected to the ring gear (25) of the fourth planetary gearset (22), and the sun gear (8) of the first planetary gearset (7) is connectable to the housing (2) by engagement of only the first shifting element (B1).

4. The motor vehicle group transmission according to claim 2, wherein if the second shifting element (B2) is connected between the carrier (9) of the first planetary gearset (7) and the housing (2), then the ring gear (10) of the first planetary gearset (7) is permanently connected to the ring gear (25) of the fourth planetary gearset (22), and the sun gear (8) of the first planetary gearset (7) is connectable to the housing (2) by engagement of only the first shifting element (B1).

5. The motor vehicle group transmission according to claim 2, wherein if the second shifting element (B2') is connected between the carrier (9) of the first planetary gearset (7) and the ring gear (25) of the fourth planetary gearset (22), then the ring gear (10) of the first planetary gearset (7) is permanently connected to the housing (2), and the sun gear (8) of the first planetary gearset (7) is connectable to the housing (2) by engagement of only the first shifting element (B1).

6. The motor vehicle group transmission according to claim 2, wherein if the second shifting element (B2") is connected between the sun gear (8) of the first planetary gearset (7) and the first shifting element (B1), then the ring gear (10) of the first planetary gearset (7) is permanently connected to the housing (2), and the carrier (9) of the first planetary gearset (7) is permanently connected to the ring gear (25) of the fourth planetary gearset (22).

7. The motor vehicle group transmission according to claim 2, wherein if the fifth shifting element (K3) is connected between the carrier (19) of the third planetary gearset (17) and the carrier (24) of the fourth planetary gearset (22), then the ring gear (20) of the third planetary gearset (17) is permanently connected to the sun gear (23) of the fourth planetary gearset (22).

8. The motor vehicle group transmission according to claim 2, wherein if the fifth shifting element (K3') is connected between the ring gear (20) of the third planetary gearset (17) and the sun gear (23) of the fourth planetary gearset (22), then the carrier (19) of the third planetary gearset (17) is permanently connected to the carrier (24) of the fourth planetary gearset (23).

9. The motor vehicle group transmission according to claim 2, wherein
the first planetary gearset (7) is positioned adjacent a drive-input-side end of the main transmission (3);
the fourth planetary gearset (22) is positioned adjacent a drive-output-side end of the main transmission (3); and
the second planetary gearset (12) and the third planetary gearset (17) are positioned between the first planetary gearset (7) and the fourth planetary gearset (22).

10. The motor vehicle group transmission according to claim 1, wherein the first, the second, the third, the fourth and the fifth shifting elements (B1, B2, K1, K2, K3) of the main transmission (3) are frictional shifting elements and the sixth, the seventh and the eighth shifting elements (R, L, H) of the range transmission (4) are interlocking shifting elements.

11. A motor vehicle group transmission comprising:
a drive input shaft, a drive output shaft and a housing;
a main transmission and a range transmission being connected downstream of the main transmission;
the main transmission comprises first, second, third and fourth planetary gearsets and first, second, third, fourth and fifth shifting elements;
the range transmission comprises fifth and sixth planetary gearsets and sixth, seventh and eighth shifting elements;
each of the first, the second, the third, the fourth, the fifth and the sixth planetary gearsets comprises a sun gear, a carrier, which rotationally supports at least one planetary gearwheel, and a ring gear;
at least thirteen forward gears being implementable by selective engagement of three of the first, the second, the third, the fourth and the fifth shifting elements and engagement of either the sixth or the seventh shifting elements;
at least first, second, third, fourth, fifth, sixth, and eighth reverse gears being implementable by engagement of the eighth shifting element, and selective engagement of three of the first, the second, the third, the fourth and the fifth shifting elements; and
a seventh reverse gear being implemented by engagement of only the first shifting element.

12. The motor vehicle group transmission according to claim 11, wherein the first, the second, the third, the fourth and the fifth shifting elements (B1, B2, K1, K2, K3) of the main transmission (3) are frictional shifting elements and the sixth, the seventh and the eighth shifting elements (R, L, H) of the range transmission (4) are interlocking shifting elements.

13. The motor vehicle group transmission according to claim 2, wherein the first, the second, the third, the fourth, the fifth, the sixth, and the eighth reverse gears are implementable by engagement of the eighth shifting element and selective engagement of three of the first, the second, the third, the fourth and the fifth shifting elements; and
the seventh reverse gear is implemented by engagement of only the first shifting element.

14. The motor vehicle group transmission according to claim 13, wherein the first, the second, the third, the fourth and the fifth shifting elements (B1, B2, K1, K2, K3) of the main transmission (3) are frictional shifting elements and the sixth, the seventh and the eighth shifting elements (R, L, H) of the range transmission (4) are interlocking shifting elements.

15. The motor vehicle group transmission according to claim 2, wherein the first, the second, the third, the fourth and the fifth shifting elements (B1, B2, K1, K2, K3) of the main transmission (3) are frictional shifting elements and the sixth, the seventh and the eighth shifting elements (R, L, H) of the range transmission (4) are interlocking shifting elements.

16. The motor vehicle group transmission according to claim 9, wherein the first, the second, the third, the fourth and the fifth shifting elements (B1, B2, K1, K2, K3) of the main transmission (3) are frictional shifting elements and the sixth, the seventh and the eighth shifting elements (R, L, H) of the range transmission (4) are interlocking shifting elements.

17. The motor vehicle group transmission according to claim 1, wherein
the first planetary gearset (7) is positioned adjacent a drive-input-side end of the main transmission (3);
the fourth planetary gearset (22) is positioned adjacent a drive-output-side end of the main transmission (3);
the second planetary gearset (12) and the third planetary gearset (17) are positioned between the first planetary gearset (7) and the fourth planetary gearset (22).

* * * * *